United States Patent
Hayashizaki et al.

(10) Patent No.: US 9,612,799 B2
(45) Date of Patent: Apr. 4, 2017

(54) METHOD, DEVICE, AND COMPUTER PROGRAM FOR MERGE-SORTING RECORD GROUPS HAVING TREE STRUCTURE EFFICIENTLY

(71) Applicant: International Business Machines Corporation, Armonk, NY (US)

(72) Inventors: Hiroshige Hayashizaki, Kawasaki (JP); Megumi Ito, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 14/569,062

(22) Filed: Dec. 12, 2014

(65) Prior Publication Data

US 2015/0178338 A1 Jun. 25, 2015

(30) Foreign Application Priority Data

Dec. 20, 2013 (JP) ................. 2013-263155

(51) Int. Cl.
G06F 17/30 (2006.01)
G06F 7/00 (2006.01)
G06F 7/32 (2006.01)

(52) U.S. Cl.
CPC ..................... G06F 7/32 (2013.01)

(58) Field of Classification Search
USPC ....................................... 707/741
See application file for complete search history.

(56) References Cited

U.S. PATENT DOCUMENTS

| 5,487,166 A * | 1/1996 | Cossock ................... G06F 7/24 707/752 |
| 2004/0193632 A1* | 9/2004 | McCool ............ G06F 17/30091 |
| 2010/0250560 A1* | 9/2010 | Shinjo ....................... G06F 7/32 707/753 |
| 2015/0081966 A1* | 3/2015 | Zheng ............... G06F 17/30327 711/114 |

FOREIGN PATENT DOCUMENTS

| JP | 773202 A | 3/1995 |
| JP | 2000010761 A | 1/2000 |
| JP | 2001517024 A | 10/2001 |
| JP | 2001357070 A | 12/2001 |

(Continued)

OTHER PUBLICATIONS

Arge et al., "On Soiling Strings in External Memory", STOC '97, Proceedings of the twenty-ninth annual ACM symposium on Theory of Computing, pp. 540-548, ISBN: 0-89791-888-6, <http://dl.acm.org/citation.cfm?id=258647>.

(Continued)

Primary Examiner — Kuen Lu
(74) Attorney, Agent, or Firm — Jay Wahlquist

(57) ABSTRACT

A first record group and a second record group having a tree structure are merge-sorted. The first record group and the second record group are acquired, and depth information indicative of the hierarchical depth of the tree structure is attached as metadata to key information on each node of each record included in the acquired first record group and second record group. The depth information is compared in preference to the key information to perform merge sort sequentially.

17 Claims, 21 Drawing Sheets

(56) References Cited

FOREIGN PATENT DOCUMENTS

| JP | 2004145640 A | 5/2004 |
|----|--------------|--------|
| JP | 200538073 A | 2/2005 |
| JP | 2009140161 A | 6/2009 |
| JP | 2011095849 A1 | 5/2011 |
| JP | 2013143040 A | 7/2013 |
| WO | 2010106680 A1 | 9/2010 |
| WO | 2013108333 A1 | 7/2013 |

OTHER PUBLICATIONS

"Burstsort", Wikipedia, the free enciclopedia, last modified on Aug. 4, 2014, <http://en.wikipedia.org/wiki/Burstsort>.
Davidson et al., "Efficient Parallel Merge Sort for Fixed and Variable Length Keys", Innovative Parallel Computing, May 2012.
Japanese Patent Application No. 2013-263155 filed Dec. 20, 2013.

\* cited by examiner

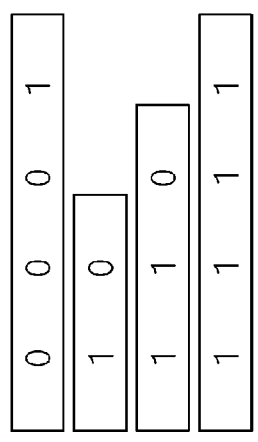
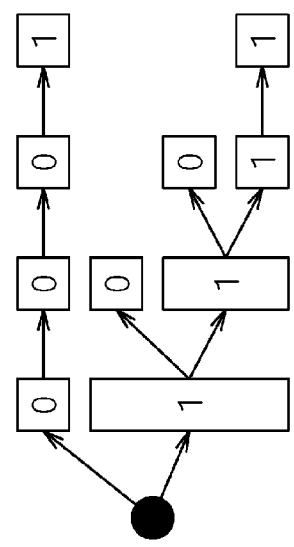
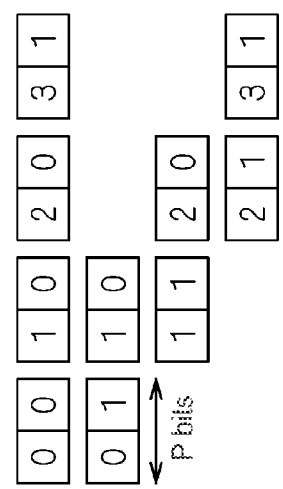
FIG. 3A
FIG. 3B
FIG. 3C
FIG. 3D

```
i0, i1: input streams, out: output stream of P-bit blocks (=key)
while(!end of stream){
    elem0 = the first element of i0;
    elem1 = the first element of i1;
    if( elem0.key < elem1.key ){ // key comparator for fixed-length sorter
        remove the first element (elem0) from i0; output elem0 to out;
    } else {
        remove the first element (elem1) from i1; output elem1 to out;
    }
}
```

FIG. 4

```
i0, i1: input streams, out: output stream of P-bit blocks(=position + key)
while(!end of stream){
    elem0 = the first element of i0;
    elem1 = the first element of i1;
    if( elem0.pos>elem1.pos || (elem0.pos==elem1.pos && elem0.key<elem1.key) ){
        remove the first element (elem0) from i0; output elem0 to out;
    }else if( elem0.pos==elem1.pos && elem0.key==elem1.key) {
        remove the first element (elem0) from i0 and i1; output elem0 to out;
    }else{
        remove the first element (elem1) from i1; output elem1 to out;
    }
}
```

FIG. 5A

```
i0, i1: input streams, out: output stream of P-bit blocks(=position + key)
while(!end of stream){
    elem0 = the first element of i0;
    elem1 = the first element of i1;
    if( elem0.pos>elem1.pos )           move the first element from i0 to out;  //Case1
    else if( elem0.pos< elem1.pos )     move the first element from i1 to out;  //Case2
    else { // elem0.pos == elem1.pos
        if( elem0.key<elem1.key )       move the first element from i0 to out;  //Case3
        else if( elem0.key>elem1.key)   move the first element from i1 to out;  //Case4
        else{ //( elem0.key==elem1.key)
            remove the first elements of i0 and i1; output elem0 to out;  //Case5
    }
}
```

FIG. 5B

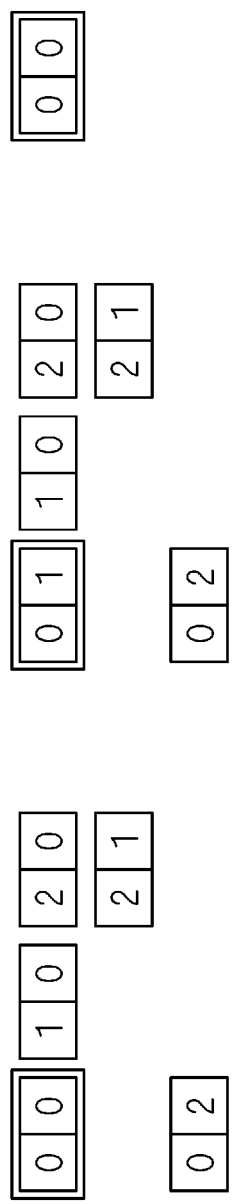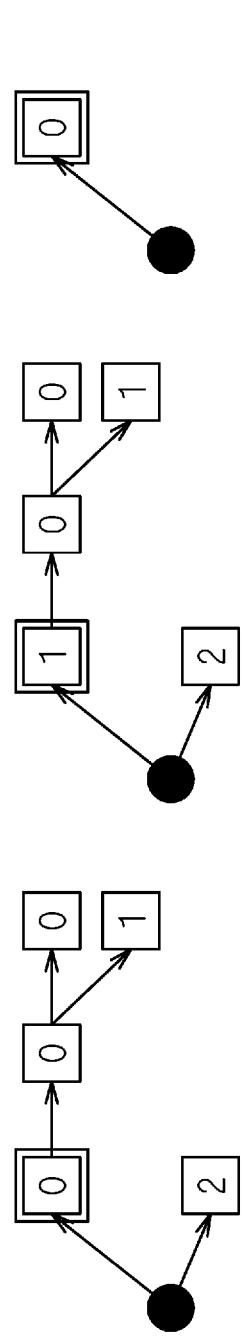
FIG. 6A  FIG. 6C  FIG. 6E
FIG. 6B  FIG. 6D  FIG. 6F

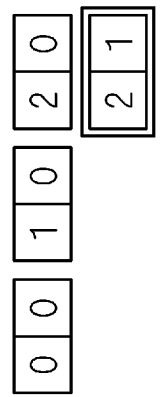
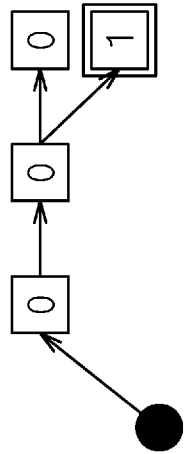
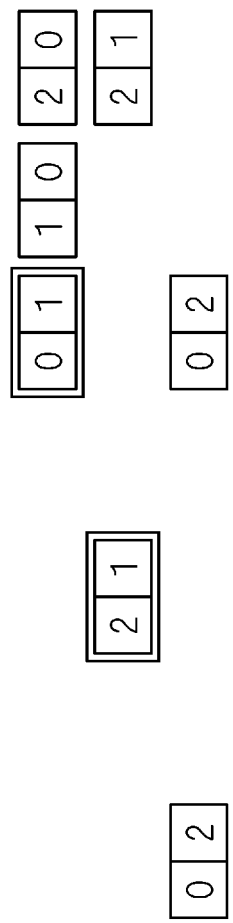
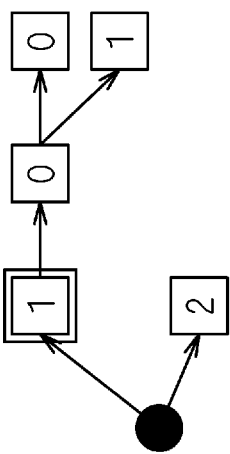
FIG. 9A
FIG. 9B
FIG. 9C
FIG. 9D
FIG. 9E
FIG. 9F

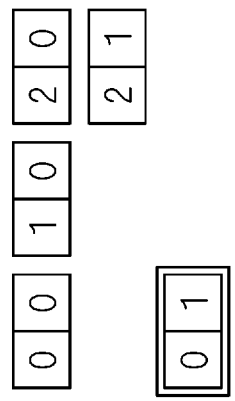
FIG. 10E
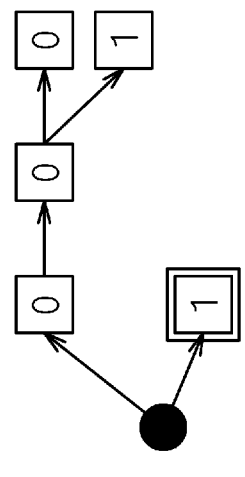
FIG. 10F
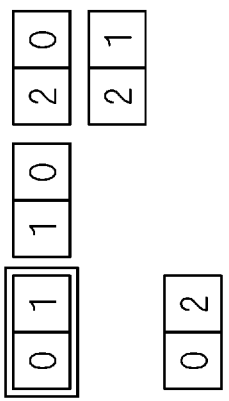
FIG. 10C
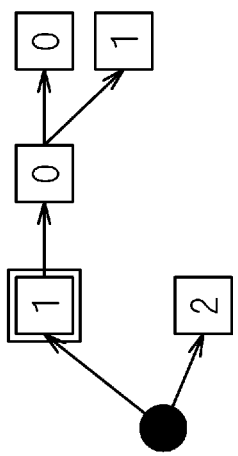
FIG. 10D
FIG. 10A
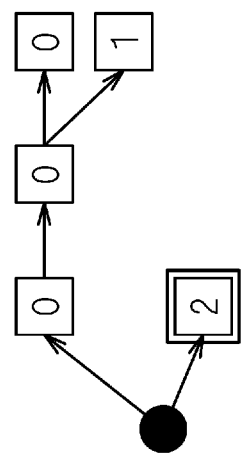
FIG. 10B

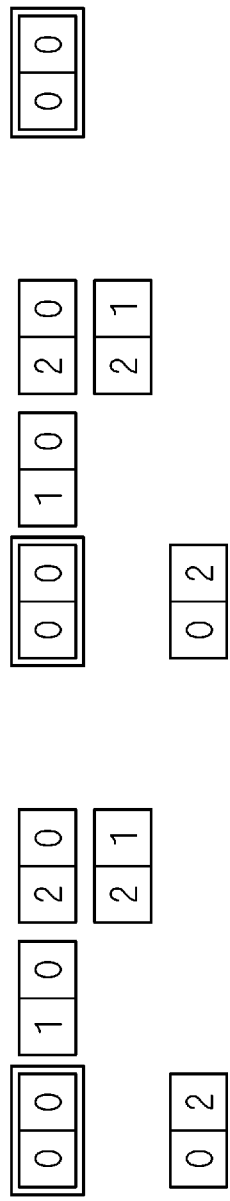
FIG. 11A
FIG. 11C
FIG. 11E
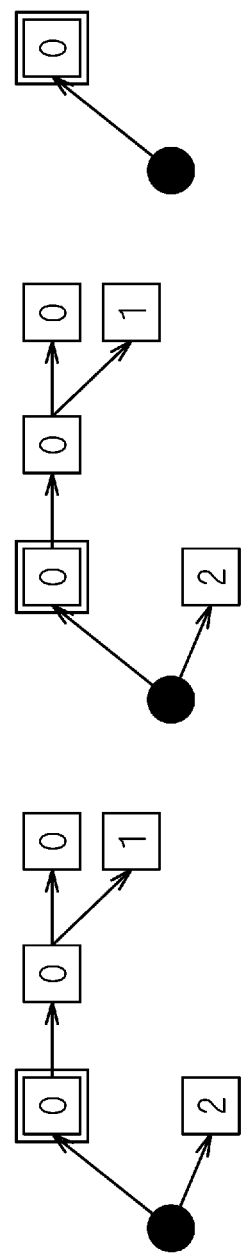
FIG. 11B
FIG. 11D
FIG. 11F

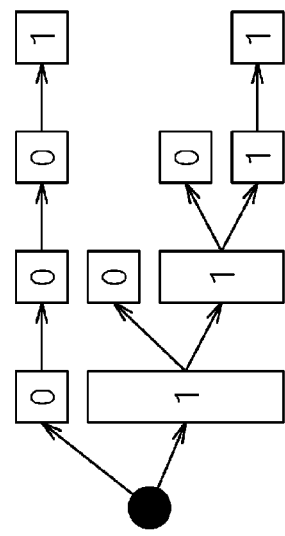

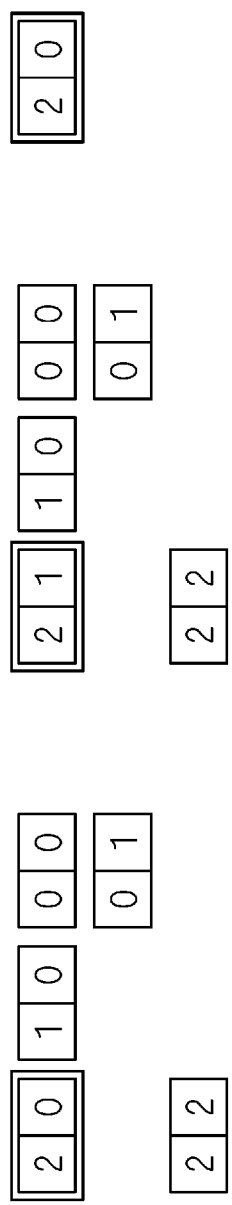
FIG. 14A
FIG. 14C
FIG. 14E
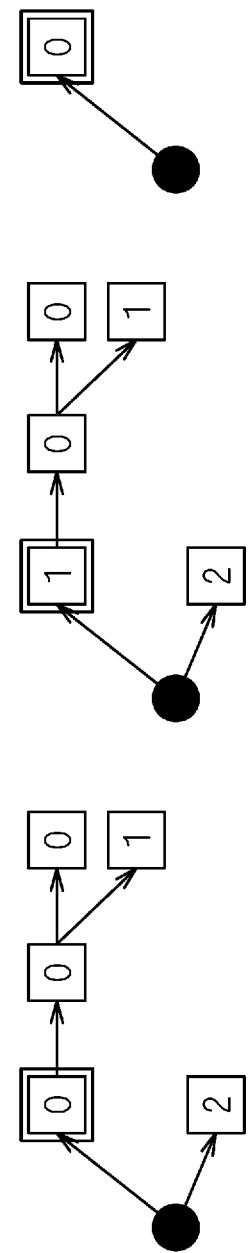
FIG. 14B
FIG. 14D
FIG. 14F

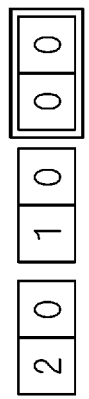
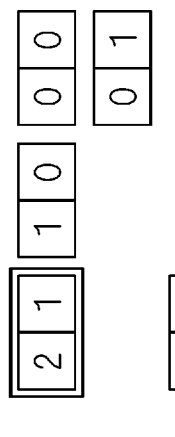
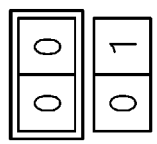
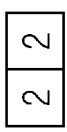
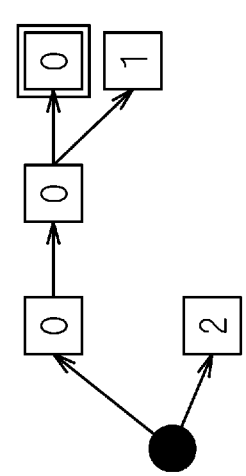
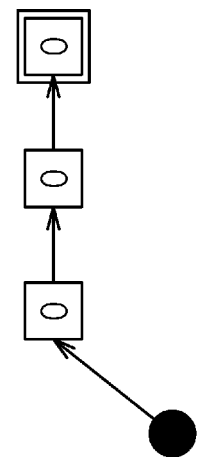
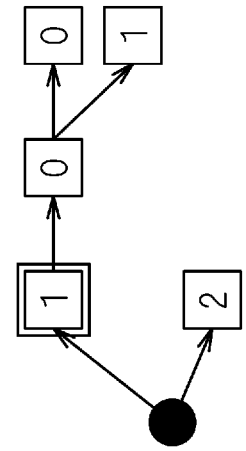

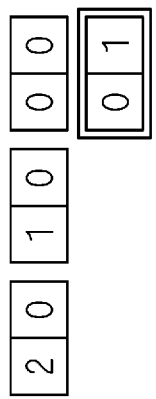
FIG. 17A
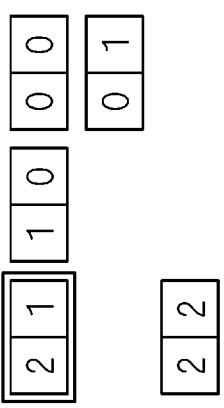
FIG. 17C
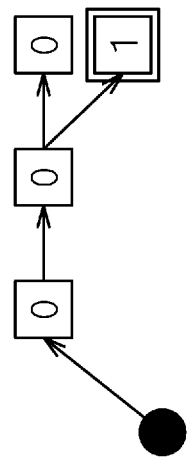
FIG. 17E
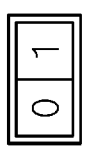
FIG. 17B
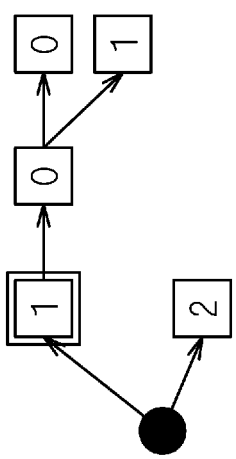
FIG. 17D
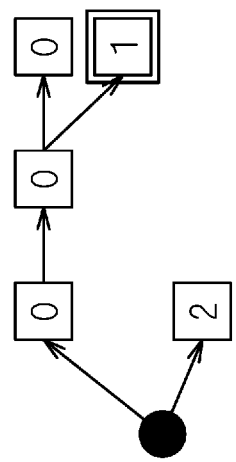
FIG. 17F

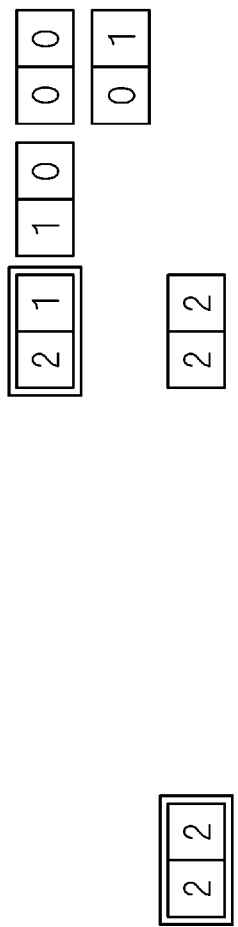
FIG. 18A
FIG. 18B
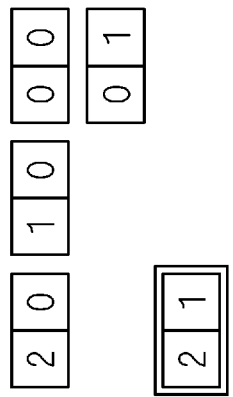
FIG. 18C
FIG. 18D
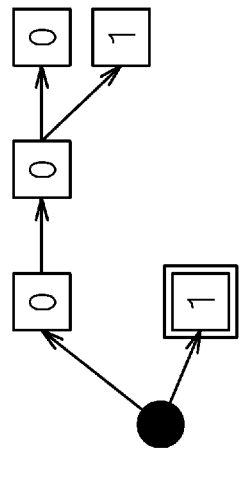
FIG. 18E
FIG. 18F

METHOD, DEVICE, AND COMPUTER PROGRAM FOR MERGE-SORTING RECORD GROUPS HAVING TREE STRUCTURE EFFICIENTLY

CROSS-REFERENCE TO RELATED APPLICATION

This application claims the benefit of priority under 35 U.S.C. §119 from Application No. 2013-263155, filed on Dec. 20, 2013 in Japan, the contents of which are incorporated by reference herein.

BACKGROUND

The present invention relates to a method, a device, and a computer program for merge-sorting record groups having a tree structure efficiently by attaching depth information as metadata, indicative of the hierarchical depth of the tree structure.

When record groups having a tree structure are merge-sorted in descending or ascending order, it is necessary to compare records sequentially record by record, which leads to relatively high computational processing load. Conventionally, an effort to pay attention to a tree structure to perform operations on the tree structure using a pointer or perform random access to a memory has been made in order to reduce the time required for the merge sort.

For example, Japanese Patent Application Publication No. 2013-143040 discloses a table processing method in which, when records included in different tables are merge-sorted, since the records have a tree structure, link information to each tree is utilized to improve the computational processing efficiency. PCT International Publication No. WO 2010/106680 discloses a tree generation device which associates one tag key with one node when generating a tree, and uses the tag key to narrow down a node region that is a comparison target when performing a retrieval process or the like in order to reduce the retrieval time.

PCT International Publication No. WO 2013/108333 discloses a search device in which previous search path information indicating a hierarchical node corresponding to a target sequence is stored and a search with a search condition the beginning of which matches that of the previous search condition is performed by limiting the search range to speed up the search.

SUMMARY

In the prior art referenced above, a tree structure is used and a search condition is stored to reduce the search time or the time required for merge sort as a whole. However, when the tree structure has a deep hierarchy or the hierarchical structure is complicated, since it is necessary to use a pointer to specify the tree structure or perform random access to a memory after all, there is a problem that the search time or the time required for merge sort may not be able to be reduced consequently.

Further, for example, when a device supports only merge sort using fixed-length key information like a device (sorter) using an FPGA, in order to perform merge sort using variable-length key information, it is necessary to update the hardware configuration to support both key information, leading to an increase in the cost. Further, the time required for merge sort using variable-length key information becomes relatively longer than the time required for merge sort using fixed-length key information. Therefore, in the case of merge sort using variable-length key information, it is difficult to reduce the time required for the merge sort.

The present invention has been made in view of the above circumstances, and an object thereof is to provide a method, a device, and a computer program for merge-sorting record groups having a tree structure efficiently by attaching depth information as metadata, indicative of the hierarchical depth of the tree structure.

In order to attain the above object, a method according to a first invention can be executed by a device for merge-sorting a first record group and a second record group having a tree structure, which performs: a first step of acquiring the first record group and the second record group; a second step of attaching depth information as metadata, indicative of a hierarchical depth in the tree structure, to key information on each node of each record included in the acquired first record group and second record group; and a third step of comparing the depth information in preference to the key information to perform merge sort sequentially.

A method according to a second invention is based on the first invention, wherein the depth information is set to a larger value as the hierarchy is deeper, and the third step includes the steps of: comparing the depth information and the key information on each node of each record included in the acquired first record group and second record group; and when one piece of the depth information is larger than the other piece of the depth information, outputting the key information whose depth information is larger; when both pieces of the depth information are identical, outputting the key information having a smaller value; or when both pieces of the depth information are identical and both pieces of the key information are identical, outputting either one piece of the key information.

A method according to a third invention is based on the first invention, wherein the depth information is set to a smaller value as the hierarchy is deeper, and the third step includes the steps of: comparing the depth information and the key information on each node of each record included in the acquired first record group and second record group; and when one piece of the depth information is smaller than the other piece of the depth information, outputting the key information whose depth information is smaller; when both pieces of the depth information are identical, outputting the key information having a smaller value; or when both pieces of the depth information are identical and both pieces of the key information are identical, outputting either one piece of the key information.

Next, in order to attain the above object, a device according to a fourth invention merge-sorts a first record group and a second record group having a tree structure, and includes: record group acquiring means for acquiring the first record group and the second record group; depth information attaching means for attaching depth information as metadata, indicative of a hierarchical depth in the tree structure, to key information on each node of each record included in the acquired first record group and second record group; and sorting means for comparing the depth information in preference to the key information to perform merge sort sequentially.

A device according to a fifth invention is based on the fourth invention, wherein the depth information is set to a larger value as the hierarchy is deeper, and the sorting means includes: comparison means for comparing the depth information and the key information on each node of each record included in the acquired first record group and second record group; and output means for outputting the key information based on the result of the comparison means, wherein the output means performs first output which, when one piece of the depth information is larger than the other piece of the depth information, outputs the key information whose depth information is larger, second output which, when both pieces of the depth information are identical, outputs the key information having a smaller value, or third output which, when both pieces of the depth information are identical and both pieces of the key information are identical, outputs either one piece of the key information.

A device according to a sixth invention is based on the fourth invention, wherein the depth information is set to a smaller value as the hierarchy is deeper, and the sorting means includes: comparison means for comparing the depth information and the key information on each node of each record included in the acquired first record group and second record group; and output means for outputting the key information based on the result of the comparison means, wherein the output means performs first output which, when one piece of the depth information is smaller than the other piece of the depth information, outputs the key information whose depth information is smaller, second output which, when both pieces of the depth information are identical, outputs the key information having a smaller value, or third output which, when both pieces of the depth information are identical and both pieces of the key information are identical, outputs either one piece of the key information.

Next, in order to attain the above object, a computer program according to a seventh invention can be executed by a device for merge-sorting a first record group and a second record group having a tree structure, and causes the device to function as: record group acquiring means for acquiring the first record group and the second record group; depth information attaching means for attaching depth information as metadata, indicative of a hierarchical depth in the tree structure, to key information on each node of each record included in the acquired first record group and second record group; and sorting means for comparing the depth information in preference to the key information to perform merge sort sequentially.

A computer program according to an eighth invention is based on the seventh invention, wherein the depth information is set to a larger value as the hierarchy is deeper, and the sorting means is caused to function as: comparison means for comparing the depth information and the key information on each node of each record included in the acquired first record group and second record group; and output means for outputting the key information based on the result of the comparison means, wherein the output means is caused to function as means for performing first output which, when one piece of the depth information is larger than the other piece of the depth information, outputs the key information whose depth information is larger, second output which, when both pieces of the depth information are identical, outputs the key information having a smaller value, or third output which, when both pieces of the depth information are identical and both pieces of the key information are identical, outputs either one piece of the key information.

A computer program according to a ninth invention is based on the seventh invention, wherein the depth information is set to a smaller value as the hierarchy is deeper, and the sorting means is caused to function as: comparison means for comparing the depth information and the key information on each node of each record included in the acquired first record group and second record group; and output means for outputting the key information based on the result of the comparison means, wherein the output means is caused to function as means for performing first output which, when one piece of the depth information is smaller than the other piece of the depth information, outputs the key information whose depth information is smaller, second output which, when both pieces of the depth information are identical, outputs the key information having a smaller value, or third output which, when both pieces of the depth information are identical and both pieces of the key information are identical, outputs either one piece of the key information.

According to the present invention, the time required for merge sort can be reduced effectively even when the tree structure has a deep hierarchy or the hierarchical structure is complicated, and an implementation to enable merge sort using variable-length key information can be made easy even if hardware capable of performing merge sort using only fixed-length key information is employed.

BRIEF DESCRIPTION OF THE DRAWINGS

FIGS. 3A, 3B, 3C, and 3D are diagrams illustrating the data structure of the sorter according to the first embodiment of the present invention.

FIG. 4 is a diagram illustrating the source code of a conventional merge sort program for a sorter using an FPGA.

FIGS. 5A and 5B are a diagram illustrating the source code of a merge sort program for the sorter according to the first embodiment of the present invention.

FIG. 6A-6F are a schematic diagram showing the first process of merge sort processing performed by the sorter according to the first embodiment of the present invention.

FIG. 9A-9F are a schematic diagram showing a process subsequent to that of FIG. 8 in the merge sort processing performed by the sorter according to the first embodiment of the present invention.

FIG. 10A-10F are a schematic diagram showing a process subsequent to that of FIG. 9 in the merge sort processing performed by the sorter according to the first embodiment of the present invention.

FIG. 11A-11F are a schematic diagram showing another example of merge sort processing performed by the sorter according to the first embodiment of the present invention.

FIGS. 13A, 13B, 13C, and 13D are diagrams illustrating the data structure of a sorter according to a second embodiment of the present invention.

FIG. 14A-14F are a schematic diagram showing the first process of merge sort processing performed by the sorter according to the second embodiment of the present invention.

FIG. 16A-16F are a schematic diagram showing a process subsequent to that of FIG. 15 in the merge sort processing performed by the sorter according to the second embodiment of the present invention.

FIG. 17A-17F are a schematic diagram showing a process subsequent to that of FIG. 16 in the merge sort processing performed by the sorter according to the second embodiment of the present invention.

FIG. 18A-18F are a schematic diagram showing a process subsequent to that of FIG. 17 in the merge sort processing performed by the sorter according to the second embodiment of the present invention.

DETAILED DESCRIPTION

Figure 1:
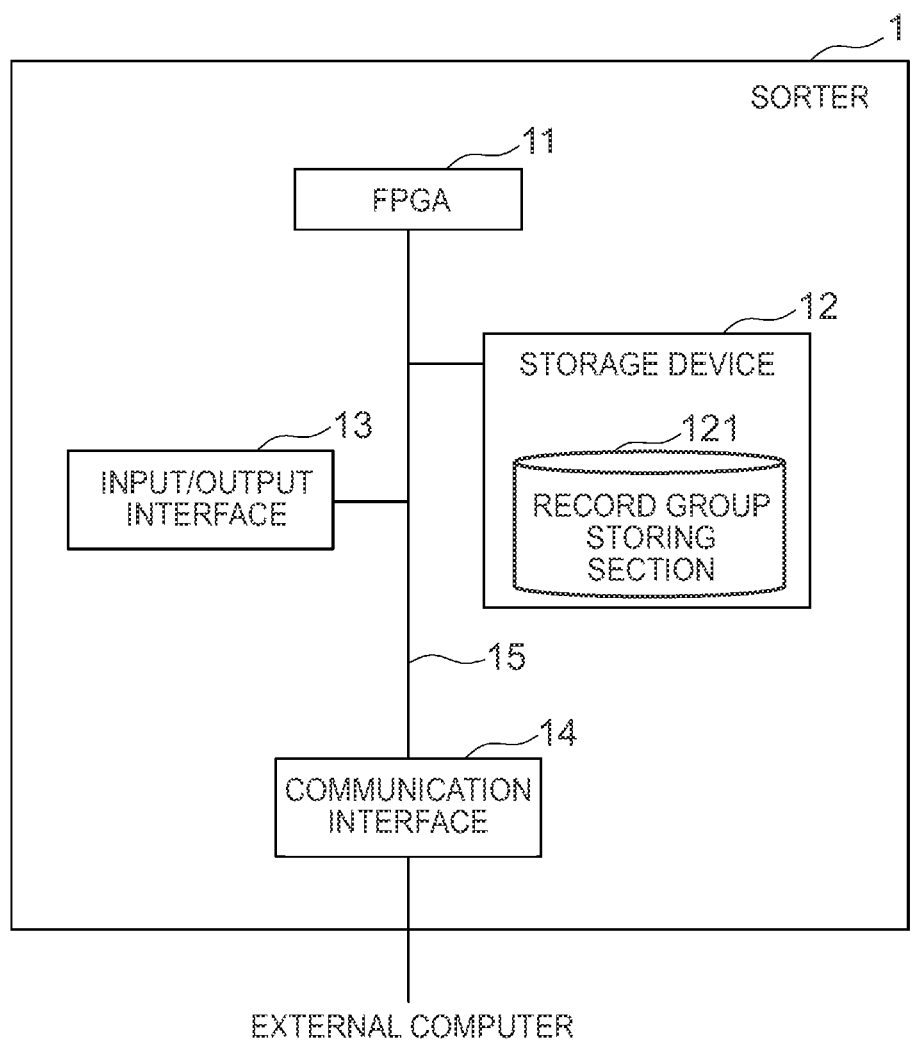
FIG. 1 is a block diagram schematically showing the configuration of a sorter according to a first embodiment of the present invention.

Devices (sorters) for attaching depth information as metadata, indicative of the hierarchical depth of a tree structure to merge-sort record groups having the tree structure efficiently according to embodiments of the present invention will be specifically described with reference to the accompanying drawings. The following embodiments do not limit the inventions described in the appended claims, and not all the combinations of features described in the embodiments are requisites as resolving means of the present invention.

The present invention can also be carried out in a variety of different modes, and should not be limited to the contents of the description of the embodiments. Note that the same reference numerals are given to the same elements throughout the embodiments.

The following embodiments will describe devices with a computer program introduced into a computer system. As will be apparent to those skilled in the art, part of the present invention can be implemented as a computer program capable of running on a computer. Therefore, the present invention can take the form of an entirely hardware embodiment as a sorter for attaching depth information as metadata, indicative of the hierarchical depth of a tree structure to merge-sort record groups having the tree structure efficiently, an entirely software embodiment, or an embodiment containing a combination of software and hardware. The computer program can be recorded on a recording medium readable by any computer, such as a hard disk, a DVD, a CD, an optical storage device, or a magnetic storage device.

According to the embodiments of the present invention, the time required for merge sort can be reduced effectively even when the tree structure has a deep hierarchy or the hierarchical structure is complicated, and an implementation to enable merge sort using variable-length key information can be made easy even if hardware capable of performing merge sort using only fixed-length key information is employed.

FIG. 1 is a block diagram schematically showing the configuration of a sorter according to a first embodiment of the present invention. A sorter 1 according to the first embodiment of the present invention is configured to include at least an FPGA 11, a storage device 12, an input/output interface 13, a communication interface 14, and an internal bus 15 for connecting the above hardware components.

The FPGA 11 is connected to each of the above hardware components of the sorter 1 through the internal bus 15 to control the operation of each of the above hardware components and execute various software functions according to a computer program stored in the storage device 12. Upon running the computer program, a load module is loaded into a memory incorporated in the FPGA 11 to run the computer program.

The storage device 12 is configured as a built-in fixed type storage device (hard disk), a RAM, or the like. The computer program stored in the storage device 12 is downloaded from an external computer connected through the communication interface 14. Of course, a portable disk drive or the like may be so mounted that the computer program will be installed from a portable recording medium, such as a DVD or a CD-ROM, on which information such as programs and data are recorded.

The storage device 12 may include a record group storing section 121 for storing acquired record groups (first record group and second record group). The record group storing section 121 may store two record groups to be merge-sorted, or store either of the two record groups to load the record groups sequentially into the memory, such as a cache memory, incorporated in the FPGA 11.

The communication interface 14 is connected to the internal bus 15 to enable data exchange with an external computer when the communication interface 14 is connected to an external network such as the Internet, a LAN, or a WAN.

The input/output interface 13 is connected to an input device, such as a keyboard and a mouse, and an output device like a display device such as a CRT display or a liquid crystal display to accept input of record groups and perform display output of the result of the merge sort.

Figure 2:
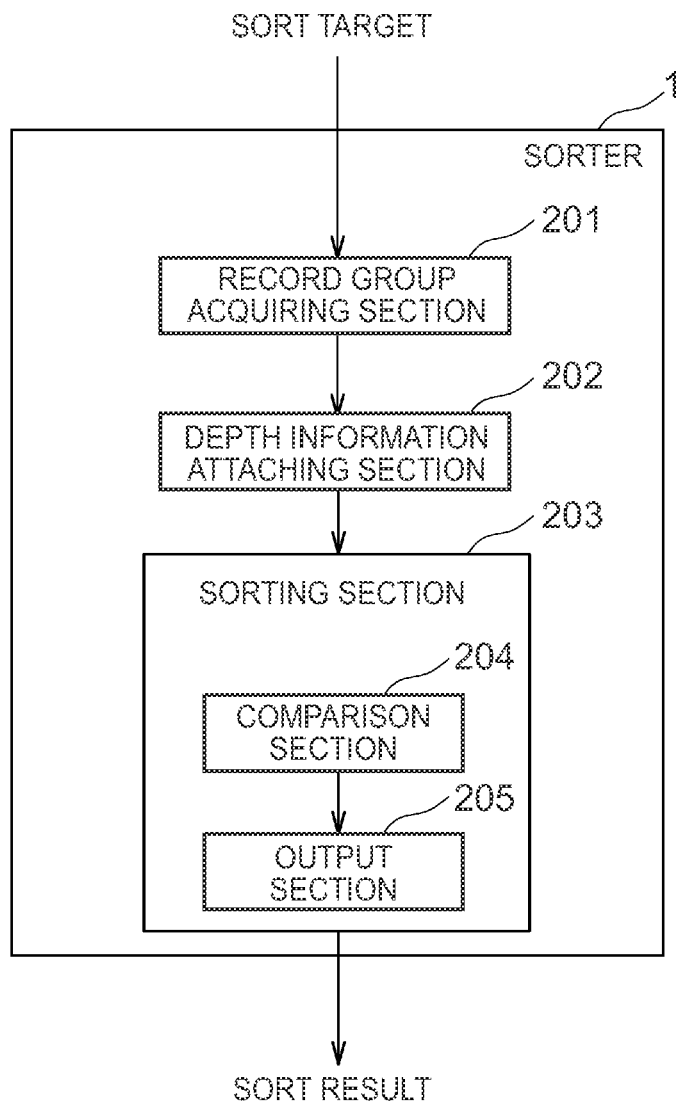
FIG. 2 is a functional block diagram of the sorter according to a first embodiment of the present invention.

FIG. 2 is a functional block diagram of the sorter 1 according to the first embodiment of the present invention. In FIG. 2, a record group acquiring section 201 of the sorter 1 acquires two record groups to be merge-sorted. As the method of acquiring the record groups, input from the input device may be accepted or received through the external network. The acquired record groups may be stored in the storage device 12 or loaded sequentially into the memory incorporated in the FPGA 11. It goes without saying that the storage device 12 can be used as a buffer.

The depth information attaching section 202 attaches depth information as metadata, indicative of a hierarchical depth in a tree structure, to key information on each node of each record included in the acquired record groups. In the following, each digit is called a node and the value of each node is called a node value. The node value becomes key information during the execution of merge sort. FIG. 3 is a diagram illustrating the data structure of the sorter 1 according to the first embodiment of the present invention. In the first embodiment, depth information is attached to each node as metadata.

For example, when a record group consisting of four records as shown in FIG. 3A is acquired, the record group is blocked per digit to establish a hierarchization as shown in FIG. 3B. For example, since the first node value of a first record is '0' and the first node values of second to fourth records are '1,' the first nodes of the second to fourth records are blocked. In the first record that is unblocked, the second node value is '0,' the third node value is '0,' and the fourth node value is '1.'

Next, the second nodes of the blocked second to fourth records are blocked in the same manner as the first nodes. In the example of FIG. 3A, since the second node value of the second record is '0' and the second node values of the third and fourth records are '1', the second nodes of the third and fourth records are blocked. In the second record that is unblocked, since there is no node value for nodes subsequent to the second node, the process is ended.

Finally, the third nodes of the blocked third and fourth records are blocked in the same manner as the first and second nodes. In the example of FIG. 3A, the third node value of the third record is '0' and the third node value of the fourth record is '1'. Since there is no node value for nodes subsequent to the third node in the third record, the process is ended, and the fourth node value in the fourth record is '1'.

Then, in the first embodiment, depth information is attached to each node value (key information) as metadata. The depth information is attached as numbers (left digits of the node values) in ascending order from a higher hierarchical level to a lower one based on the hierarchization in FIG. 3B as a result of blocking the record group.

For example, as shown in FIG. 3C, depth information '0' (left digit '0') is attached as metadata to a node value '0' on the highest hierarchical level (first node) of the first record. Depth information '1' (left digit '1') is attached as metadata to a node value '0' on the next hierarchical level (second node). Hereinafter, the depth information is attached to a node value as metadata (as the left digit of the node value) while incrementing the depth information by "one" each time the hierarchical level moves up. Although these blocks are indented per hierarchical level in FIG. 3C to make the correspondence relation to FIG. 3B understandable, the actual output of the depth information attaching section 202 is an array of these blocks simply lined up consecutively as shown in FIG. 3D.

Here, it is preferred that the total bits of the depth information (metadata) and the node value (key information) be fixed (P bits in FIG. 3). In this case, for example, even if the sorter can support only merge sort based on fixed-length data like the FPGA 11, the value including the depth information (metadata) can be handled as fixed-length data. Even in the case of variable-length data, a conventional processing algorithm can be utilized to perform merge sort.

FIG. 4 is a diagram illustrating the source code of a conventional merge sort program for a sorter 1 using an FPGA 11. The source code in FIG. 4 is written in C language. As shown in FIG. 4, since the key information has a fixed length, a process to compare key information on record (element) 0 and key information on record (element) 1 to perform merge sort is described on the fifth and subsequent lines.

On the other hand, FIGS. 5A and 5B contain diagrams illustrating the source code of a merge sort program for the sorter 1 according to the first embodiment of the present invention. The source code in FIGS. 5A and 5B is also written in C language. As shown in FIG. 5A, a process to perform merge sort based on both results of a comparison between depth information on record (element) '0' and depth information on record (element) '1', and a comparison between key information on record (element) '0' and key information on record (element) '1' is described. FIG. 5B is source code obtained by organized and rewriting the source code in FIG. 5A.

Thus, the sum of the bits of the depth information and the bits of the key information is kept at a fixed length to carry out a minimum implementation in order to enable the conventional merge sort program, which compares pieces of fixed-length key information, to function as a merge sort program for comparing pieces of variable-length key information.

Returning to FIG. 2, a sorting section 203 compares depth information in preference to key information to perform merge sort sequentially. In the first embodiment, the depth information is set to a larger value as the hierarchy is deeper as mentioned above. The sorting section 203 includes a comparison section 204 and an output section 205.

The comparison section 204 compares depth information and key information (node value) on each node of each record included in acquired record groups.

The output section 205 performs either one of three kinds of output based on the comparison result in the comparison section 204. First, when one piece of depth information is larger than the other piece of the depth information, key information (node value) on the node of the record the depth information of which is larger is output (first output).

When the pieces of depth information are identical, smaller key information (node value) is output (second output). Then, when the pieces of depth information are identical and the pieces of key information (node values) are identical, either one piece of key information (node value) is output (third output). The following will describe an actual merge sort procedure and the result with reference to FIG. 6 to FIG. 11.

FIG. 6A to 6F are a schematic diagram showing the first process of merge sort processing performed by the sorter 1 according to the first embodiment of the present invention. In a first record group shown in FIG. 6A and a second record group shown in FIG. 6C, depth information (the left digit of each node value) is attached as metadata to each key information (node value) by the method mentioned above.

Block sequences in FIG. 6A and FIG. 6C represent data streams in tree structures shown in FIG. 6B and FIG. 6D, respectively. Although the representations of data streams are also shown together with the block sequences in the subsequent drawings, the representations are just shown to interpret the meaning of the operation, and the data streams in the tree structures are not input to the sorter 1. The data structures directly operated by the sorter 1 are the block sequences shown in FIG. 6A and FIG. 6C. Upon starting the merge sort processing, '0' (a node value surrounded by the double rectangle) in FIG. 6B and '1' (a node value surrounded by the double rectangle) in FIG. 6D are first compared.

In the first embodiment, since metadata is attached to each node value, block '00' (a node value surrounded by the double rectangle) in FIG. 6A and block '01' (a node value surrounded by the double rectangle) are compared in practice. The FPGA 11 first compares metadata as pieces of depth information, i.e., the left digits. In the case of this example, since both values of the depth information are '0', node values (right digits) as pieces of key information are compared next.

In the example of FIG. 6A-6F, since the key information (node value) in FIG. 6A is smaller, the block '00' including the metadata is output (FIG. 6E). As the data stream, the first hierarchical node value '0' is output as shown in FIG. 6F.

FIG. 7A to 7F are a schematic diagram showing a process subsequent to that of FIG. 6A-6F in the merge sort processing performed by the sorter 1 according to the first embodiment of the present invention. In the first embodiment, since blocks including the output key information (node value) are deleted sequentially, the output block '00' is deleted from the first record group shown in FIG. 7A, and a target to be compared is block '10' (a block surrounded by the double rectangle) located next.

Figure 7E:
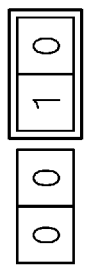
FIG. 7A-7F are a schematic diagram showing a process subsequent to that of FIG. 6 in the merge sort processing performed by the sorter according to the first embodiment of the present invention.
Figure 7F:
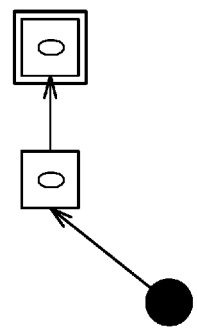
Figure 7C:
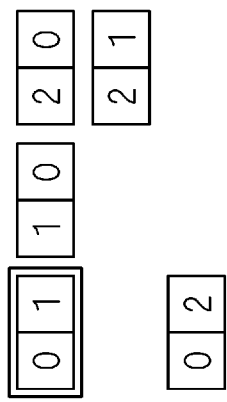
Figure 7D:
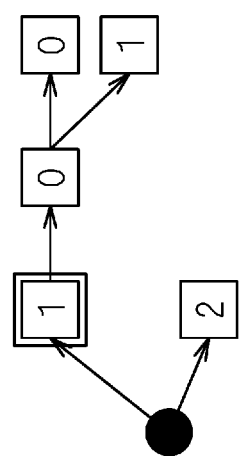
Figure 7A:
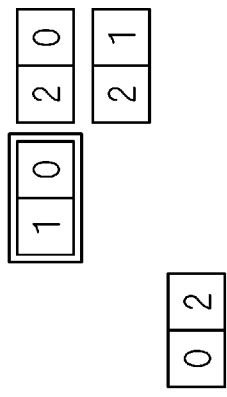
Figure 7B:
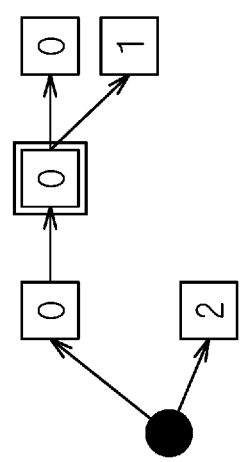

An interpretation of this as a data stream is shown in FIG. 7B and FIG. 7D, respectively, which corresponds to a comparison between '0' (a node value surrounded by the double rectangle) in FIG. 7B and '1' (a node value surrounded by the double rectangle) in FIG. 7D.

The FPGA 11 compares block '10' (a node value surrounded by the double rectangle) in FIG. 7A and block '01' (a node value surrounded by the double rectangle) in FIG. 7C. Specifically, metadata as pieces of depth information, i.e., the left digits are first compared. In the case of this example, since the depth information in FIG. 7A has a larger value '1', the block '10' including the metadata is output (FIG. 7E). As the data stream, this corresponds to the output of the next hierarchical node value '0' after the first hierarchical node value '0' as shown in FIG. 7F.

FIG. 8A-8F are a schematic diagram showing a process subsequent to that of FIG. 7A-7F in the merge sort processing performed by the sorter 1 according to the first embodiment of the present invention. In the first embodiment, since blocks including the output key information (node value) are deleted sequentially, the output block '10' is deleted from the first record group shown in FIG. 8A, and a target to be compared is block '20' (a block surrounded by the double rectangle) located next.

Figure 8A:
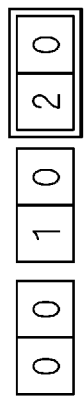
FIG. 8A-8F are a schematic diagram showing a process subsequent to that of FIG. 7 in the merge sort processing performed by the sorter according to the first embodiment of the present invention.
Figure 8C:
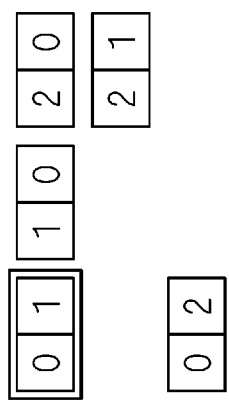
Figure 8E:
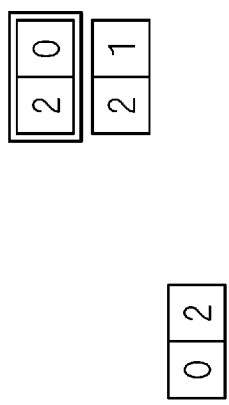
Figure 8B:
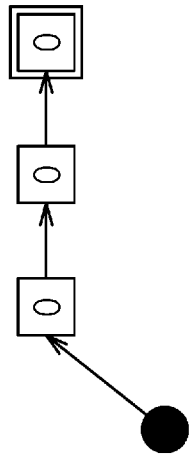
Figure 8D:
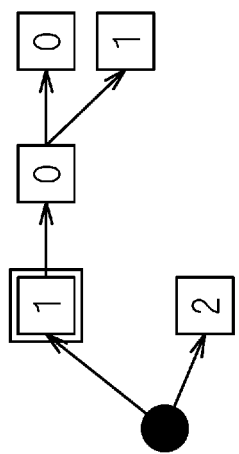

An interpretation of this as a data stream is shown in FIG. 8B and FIG. 8D, respectively, which corresponds to a comparison between '0' (a node value surrounded by the double rectangle) in FIG. 8B and '1' (a node value surrounded by the double rectangle) in FIG. 8D.

Figure 8F:
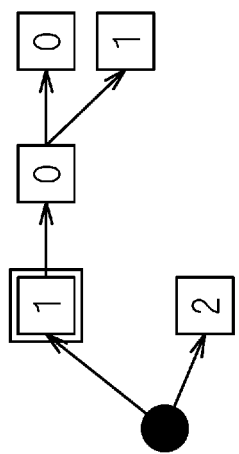

The FPGA 11 compares block '20' (a node value surrounded by the double rectangle) in FIG. 8A and block '01' (a node value surrounded by the double rectangle) in FIG. 8C. Specifically, metadata as pieces of depth information, i.e., the left digits are first compared. In the case of this example, since the depth information in FIG. 8A has a larger value '2', the block '20' including the metadata is output (FIG. 8E). As the data stream, this corresponds to the output of a hierarchical node value '0' after the next is output following the first hierarchical node value '0' and the next hierarchical node value '0' as shown in FIG. 8F.

FIG. 9A-9F are a schematic diagram showing a process subsequent to that of FIG. 8A-8F in the merge sort processing performed by the sorter 1 according to the first embodiment of the present invention. In the first embodiment, since blocks including the output key information (node value) are deleted sequentially, the output block '20' is deleted from the first record group shown in FIG. 9A, and a target to be compared is block '21' (a block surrounded by the double rectangle) located next.

An interpretation of this as a data stream is shown in FIG. 9B and FIG. 9D, respectively, which corresponds to a comparison between '1' (a node value surrounded by the double rectangle) in FIG. 9B and '1' (a node value surrounded by the double rectangle) in FIG. 9D.

The FPGA 11 compares block '21' (a node value surrounded by the double rectangle) in FIG. 9A and block '01' (a node value surrounded by the double rectangle) in FIG. 9C. Specifically, metadata as pieces of depth information, i.e., the left digits are first compared. In the case of this example, since the depth information in FIG. 9A has a larger value '2', the block '21' including the metadata as the output is output (FIG. 9E). As the data stream, this corresponds to the output of a branching node value '1' below the first hierarchical node value '0', the next node value '0', and the hierarchical node value '0' after the next as shown in FIG. 9F.

FIG. 10A-10F are a schematic diagram showing a process subsequent to that of FIG. 9A-9F in the merge sort processing performed by the sorter 1 according to the first embodiment of the present invention. In the first embodiment, since blocks including the output key information (node value) are deleted sequentially, the output block '21' is deleted from the first record group shown in FIG. 10A, and a target to be compared is block '02' (a block surrounded by the double rectangle) located next.

An interpretation of this as a data stream is shown in FIG. 10B and FIG. 10D, respectively, which corresponds to a comparison between '2' (a node value surrounded by the double rectangle) in FIG. 10B and '1' (a node value surrounded by the double rectangle) in FIG. 10D.

The FPGA 11 compares block '02' (a node value surrounded by the double rectangle) in FIG. 10A and '01' (a node value surrounded by the double rectangle) in FIG. 10C. Specifically, metadata as pieces of depth information, i.e., the left digits are first compared. In the case of this example, since both pieces of depth information have a value '0', the node values (the right digits) as pieces of key information are compared next.

In the example of FIG. 10A-10F, since the node value in FIG. 10C is smaller, the block '01' including the metadata is output (FIG. 10E). Thereafter, the processing is continued in the same way (FIG. 10F).

When either the first block sequence or the second block sequence reaches the terminal end, the block sequence that does not reach the terminal end is output. The processing ends when both of the block sequences reach the terminal end.

Further, when both the depth information and the key information (node value) are identical, all that is required is that the identical block (depth information and key information) is output and the following blocks are compared next, respectively. FIG. 11A-11F are a schematic diagram showing another example of merge sort processing performed by the sorter 1 according to the first embodiment of the present invention. Like in FIG. 6A-6F, depth information is attached as metadata to key information (node value) in a first record group shown in FIG. 11A and a second record group shown in FIG. 11C by the method mentioned above.

An interpretation of this as a data stream is shown in FIG. 11B and FIG. 11D, respectively, which corresponds to a comparison between '0' (a node value surrounded by the double rectangle) in FIG. 11B and '0' (a node value surrounded by the double rectangle) in FIG. 11D.

The FPGA 11 compares block '00' (a node value surrounded by the double rectangle) in FIG. 11A and block '00' (a node value surrounded by the double rectangle) in FIG. 11C. Specifically, metadata as pieces of depth information, i.e., the left digits are first compared. In the case of this example, since both pieces of depth information have a value '0', the node values (the right digits) as pieces of key information are compared next.

In the example of FIG. 11, since both of node values are also '0' identical to each other in FIG. 11A and FIG. 11C, the block '00' common to both is output (FIG. 11E). As the data stream, this corresponds to the output of the first hierarchical node value '0' as shown in FIG. 11F.

In other words, when both are identical in each unit of the block with metadata attached thereto, either one of blocks common to both is output, and the target block '00' is deleted from both record groups.

Figure 12:
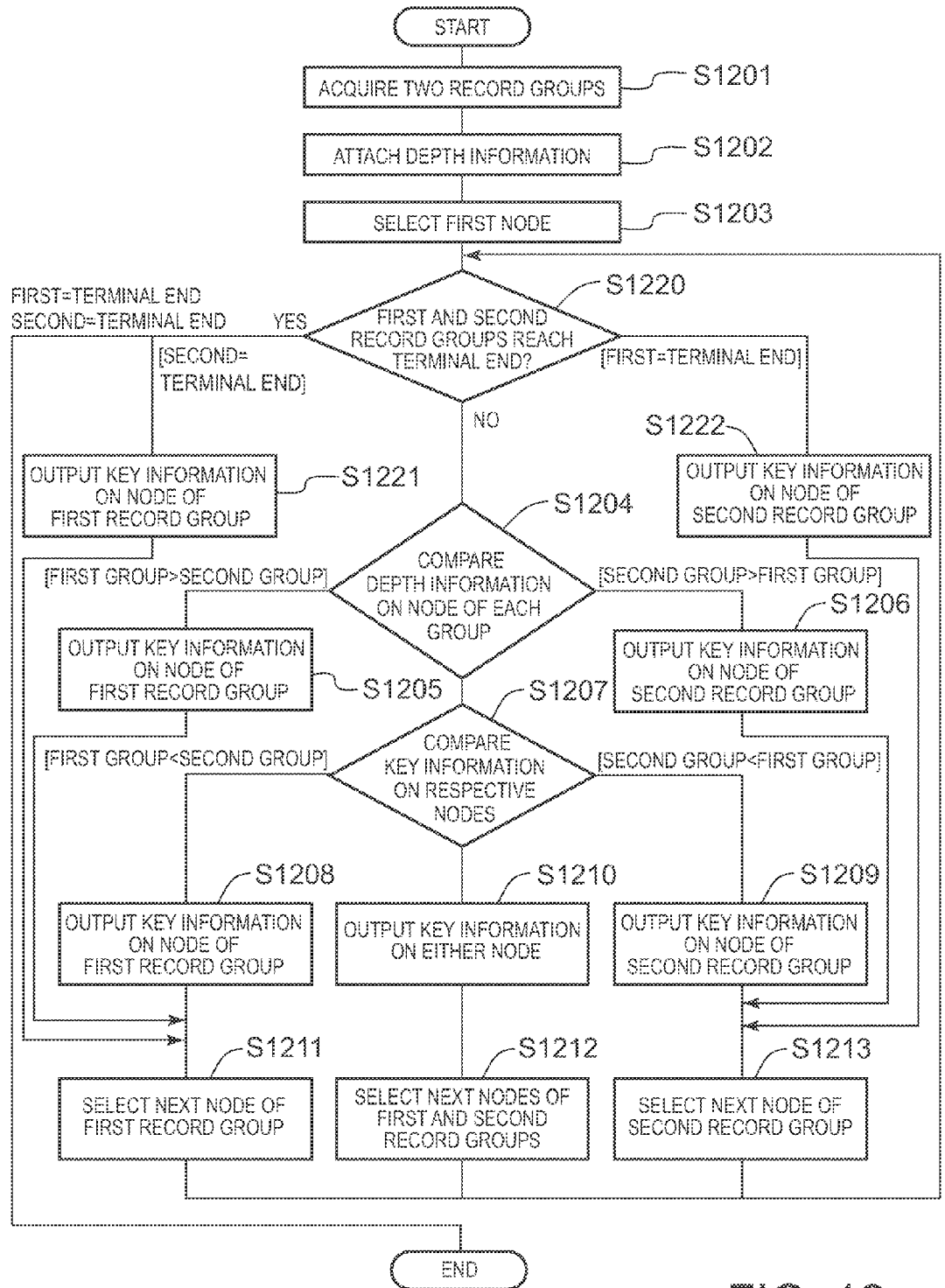
FIG. 12 is a flowchart showing a processing procedure performed by an FPGA of the sorter according to the first embodiment of the present invention.

FIG. 12 is a flowchart showing a processing procedure performed by the FPGA 11 of the sorter 1 according to the first embodiment of the present invention. In FIG. 12, the FPGA 11 of the sorter 1 acquires two record groups as targets of merge sort (step S1201). As the method of acquiring the record groups, input from the input device may be accepted or received through a network. The acquired record groups may be stored in the storage device 12 or loaded sequentially into the memory incorporated in the FPGA 11. It goes without saying that the storage device 12 can be used as a buffer.

The FPGA 11 attaches depth information as metadata, indicative of a hierarchical depth in a tree structure, to key information on each node of each record included in the acquired record groups (step S1202). The FPGA 11 selects the first nodes of the first record group and the second record group as comparison targets (step S1203), and determines whether the first record group and the second record group reach their terminal ends (step S1220).

When determining that both the first record group and the second record group reach the terminal ends (First=Terminal End and Second=Terminal End in step S1220), the FPGA 11 ends the processing. When determining that only the second record group reaches the terminal end (First≠Terminal End and Second=Terminal End in step S1220), the FPGA 11 outputs key information (node value) on the node of the first record group (step S1221), and advances the processing to step S1211.

When determining that only the first record group reaches the terminal end (First=Terminal End and Second≠Terminal End in step S1220), the FPGA 11 outputs key information (node value) on the node of the second record group (step S1222), and advances the processing to step S1213. When determining that neither the first record group nor the second record group reaches the terminal end (First≠Terminal End and Second≠Terminal End in step S1220), the FPGA 11 compares the depth information on the node of the first record group and the depth information on the node of the second record group (step S1204).

When determining that the depth information on the node of the first record group is larger than the depth information on the node of the second record group (First>Second in step S1204), the FPGA 11 outputs the key information (node value) on the node of the first record group (step S1205), and advances the processing to step S1211. When determining that the depth information on the node of the second record group is larger than the depth information on the node of the first record group (First<Second in step S1204), the FPGA 11 outputs the key information (node value) on the node of the second record group (step S1206), and advances the processing to step S1213.

When determining that the depth information on the node of the first record group and the depth information on the node of the second record group are the same (First=Second in step S1204), the FPGA 11 compares key information on respective nodes (step S1207).

When determining that the key information on the node of the first record group is smaller than the key information on the node of the second record group (First<Second in step S1207), the FPGA 11 outputs the key information (node value) on the node of the first record group (step S1208). The FPGA 11 selects the next node of the first record group (step S1211), and returns the processing to step S1220 to repeat the above-mentioned processes.

When determining that the key information on the node of the second record group is smaller than the key information on the node of the first record group (First>Second in step S1207), the FPGA 11 outputs the key information (node value) on the node of the second record group (step S1209). The FPGA 11 selects the next node of the second record group (step S1213), and returns the processing to step S1220 to repeat the above-mentioned processes.

When determining that the key information on the node of the first record group and the key information on the node of the second record group are the same (First=Second in step S1207), the FPGA 11 outputs the key information on either one of the nodes (step S1210). The FPGA 11 selects the next nodes of the first record group and the second record group (step S1212), and returns the processing to step S1220 to repeat the above-mentioned processes.

As described above, according to the first embodiment, the time required for merge sort can be reduced effectively even when the tree structure has a deep hierarchy or the hierarchical structure is complicated, and an implementation to enable merge sort using variable-length key information can be made easy even if hardware capable of performing merge sort using only fixed-length key information is employed.

Since the configuration and functional blocks of a sorter according to a second embodiment of the present invention are the same as those of the first embodiment, the same reference numerals are given to the same elements to omit the detailed description thereof. The second embodiment differs from the first embodiment in that the depth information attaching section 202 attaches depth information to each node value as metadata in descending order from a higher hierarchical level to a lower one.

FIG. 13A-13D are a diagram illustrating the data structure of a sorter 1 according to the second embodiment of the present invention. When a record group consisting of four records as shown in FIG. 13A is acquired, this record group is blocked per digit to establish a hierarchization as shown in FIG. 13B in the same manner as in the first embodiment.

Then, in the second embodiment, depth information is attached to each node value (key information) as metadata. Contrary to the first embodiment, the depth information is attached as numbers (left digits of the node values) in descending order from a higher hierarchical level to a lower one based on the hierarchization in FIG. 13B as a result of blocking the record group.

For example, as shown in FIG. 13C, depth information '3' (left digit '3') is attached as metadata to a node value '0' on the highest hierarchical level (first node) of the first record. Depth information '2' (left digit '2') is attached as metadata to a node value '0' on the next hierarchical level (second node). Hereinafter, the depth information is attached to a node value as metadata (as the left digit of each node value) while decrementing the depth information by "one" each time the hierarchical level moves up. Although these blocks are indented per hierarchical level in FIG. 13C to make the correspondence relation to FIG. 13B understandable, the actual output of the depth information attaching section 202 is an array of these blocks simply lined up consecutively as shown in FIG. 13D.

Like in the first embodiment, it is preferred that the total bits of the depth information (metadata) and the node value (key information) be fixed (P bits identical to that in FIG. 3). In this case, for example, even if the sorter can support only merge sort based on fixed-length data like the FPGA 11, the value including the depth information (metadata) can be handled as fixed-length data. Even in the case of variable-length data, the conventional processing algorithm can be utilized to perform merge sort.

Then, in the second embodiment, processing performed by the comparison section 204 and the output section 205 in FIG. 2 is different from that in the first embodiment. In other words, the comparison section 204 compares depth information and key information (node value) on each node of each record included in acquired record groups.

The output section 205 performs either one of three kinds of output based on the comparison result in the comparison section 204. First, when one piece of depth information is smaller than the other piece of the depth information, key information (node value) on the node of the record the depth information of which is smaller is output (first output).

When the pieces of depth information are identical, smaller key information (node value) is output (second output). Then, when the pieces of depth information are identical and the pieces of key information (node value) are identical, either one piece of key information (node value) is output (third output). The following will describe an actual merge sort procedure and the result with reference to FIG. 14 to FIG. 19.

FIG. 14A-14F are a schematic diagram showing the first process of merge sort processing performed by the sorter 1 according to the second embodiment of the present invention. In a first record group shown in FIG. 14A and a second record group shown in FIG. 14C, depth information (the left digit of each node value) is attached as metadata to each key information (node value) by the method mentioned above.

An interpretation of this as a data stream is shown in FIG. 14B and FIG. 14D, respectively, which corresponds to a comparison between '0' (a node value surrounded by the double rectangle) in FIG. 14B and '1' (a node value surrounded by the double rectangle) in FIG. 14D upon starting the merge sort processing.

In the second embodiment, since metadata is attached to each node value, block '20' (a node value surrounded by the double rectangle) in FIG. 14A and block '21' (a node value surrounded by the double rectangle) in FIG. 14C are compared in practice. The FPGA 11 first compares metadata as pieces of depth information, i.e., the left digits. In the case of this example, since both values of the depth information are '2', node values (right digits) as pieces of key information are compared next.

In the example of FIG. 14, since the key information (node value) in FIG. 14A is smaller, the block '20' including the metadata is output (FIG. 14E). As the data stream, this corresponds to the output of the first hierarchical node value '0' as shown in FIG. 14F.

FIG. 15A-15F are a schematic diagram showing a process subsequent to that of FIG. 14 in the merge sort processing performed by the sorter 1 according to the second embodiment of the present invention. In the second embodiment, since blocks including the output key information (node value) are deleted sequentially, the output block '20' is deleted from the first record group shown in FIG. 15A, and a target to be compared is block '10' (a block surrounded by the double rectangle) located next.

Figures 15A, 15C, 15E:
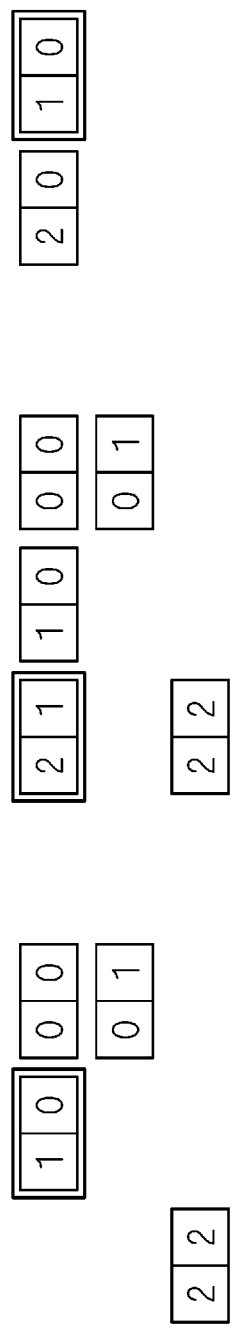
FIG. 15A-15F are a schematic diagram showing a process subsequent to that of FIG. 14 in the merge sort processing performed by the sorter according to the second embodiment of the present invention.
Figures 15B, 15D, 15F:
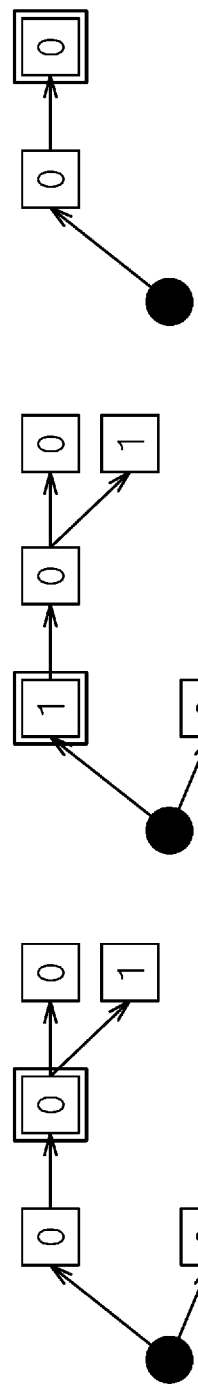

An interpretation of this as a data stream is shown in FIG. 15B and FIG. 15D, respectively, which corresponds to a comparison between '0' (a node value surrounded by the double rectangle) in FIG. 15B and '1' (a node value surrounded by the double rectangle) in FIG. 15D.

The FPGA 11 compares block '10' (a node value surrounded by the double rectangle) in FIG. 15A and block '21' (a node value surrounded by the double rectangle) in FIG. 15C. Specifically, metadata as pieces of depth information, i.e., the left digits are first compared. In the case of this example, since the depth information in FIG. 15A has a smaller value '1', the block '10' including the metadata is output (FIG. 15E). As the data stream, this corresponds to the output of the next hierarchical node value '0' after the first hierarchical node value '0' as shown in FIG. 15F.

FIG. 16A-16F are a schematic diagram showing a process subsequent to that of FIG. 15 in the merge sort processing performed by the sorter 1 according to the second embodiment of the present invention. In the second embodiment, since blocks including the output key information (node value) are deleted sequentially, the output block '10' is deleted from the first record group shown in FIG. 16A, and a target to be compared is block '00' (a block surrounded by the double rectangle) located next.

An interpretation of this as a data stream is shown in FIG. 16B and FIG. 16D, respectively, which corresponds to a comparison between '0' (a node value surrounded by the double rectangle) in FIG. 16B and '1' (a node value surrounded by the double rectangle) in FIG. 16D.

The FPGA 11 compares block '00' (a node value surrounded by the double rectangle) in FIG. 16A and block '21' (a node value surrounded by the double rectangle) in FIG. 16C. Specifically, metadata as pieces of depth information, i.e., the left digits are first compared. In the case of this example, since the depth information in FIG. 16A has a smaller value '0', the block '00' including the metadata is output (FIG. 16E). As the data stream, this corresponds to the output of a hierarchical node value '0' after the next following the first hierarchical node value '0' and the next hierarchical node value '0' as shown in FIG. 16F.

FIG. 17A-17F are a schematic diagram showing a process subsequent to that of FIG. 16 in the merge sort processing performed by the sorter 1 according to the second embodiment of the present invention. In the second embodiment, since blocks including the output key information (node value) are deleted sequentially, the output block '00' is deleted from the first record group shown in FIG. 17A, and a target to be compared is block '01' (a block surrounded by the double rectangle) located next.

An interpretation of this as a data stream is shown in FIG. 17B and FIG. 17D, respectively, which corresponds to a comparison between '1' (a node value surrounded by the double rectangle) in FIG. 17B and '1' (a node value surrounded by the double rectangle) in FIG. 17D.

The FPGA 11 compares block '01' (a node value surrounded by the double rectangle) in FIG. 17A and block '21' (a node value surrounded by the double rectangle) in FIG. 17C. Specifically, metadata as pieces of depth information, i.e., the left digits are first compared. In the case of this example, since the depth information in FIG. 17A has a smaller value '0', the block '01' including the metadata is output (FIG. 17E). As the data stream, this corresponds to the output of a branching node value '1' below the first hierarchical node value '0', the next node value '0', and the hierarchical node value '0' after the next as shown in FIG. 17F.

FIG. 18A-18F are a schematic diagram showing a process subsequent to that of FIG. 17 in the merge sort processing performed by the sorter 1 according to the second embodiment of the present invention. In the second embodiment, since blocks including the output key information (node value) are deleted sequentially, the output block '01' is deleted from the first record group shown in FIG. 18A, and a target to be compared is block '22' (a block surrounded by the double rectangle) located next.

An interpretation of this as a data stream is shown in FIG. 18B and FIG. 18D, respectively, which corresponds to a comparison between '2' (a node value surrounded by the double rectangle) in FIG. 18B and '1' (a node value surrounded by the double rectangle) in FIG. 18D.

The FPGA 11 compares block '22' (a node value surrounded by the double rectangle) in FIG. 18A and block '21' (a node value surrounded by the double rectangle) in FIG. 18C. Specifically, metadata as pieces of depth information, i.e., the left digits are first compared. In the case of this example, since both pieces of depth information have a value '2', the node values (the right digits) as pieces of key information are compared next.

In the example of FIG. 18, since the node value in FIG. 18C is smaller, the block '21' including the metadata is output (FIG. 18E). Thereafter, the processing is continued in the same way (FIG. 18F).

When either the first block sequence or the second block sequence reaches the terminal end, the block sequence that does not reach the terminal end is output. The processing is ended when both of the block sequences reach the terminal end.

Further, when both the depth information and the key information (node value) are identical, all that is required is that the identical block (depth information and key information) is output and the following blocks are compared next, respectively. FIG. 19A-19F are a schematic diagram showing another example of merge sort processing performed by the sorter 1 according to the second embodiment of the present invention. Like in FIG. 14, depth information is attached to key information (node value) as metadata in a first record group shown in FIG. 19A and a second record group shown in FIG. 19C by the method mentioned above.

Figures 19A, 19C, 19E:
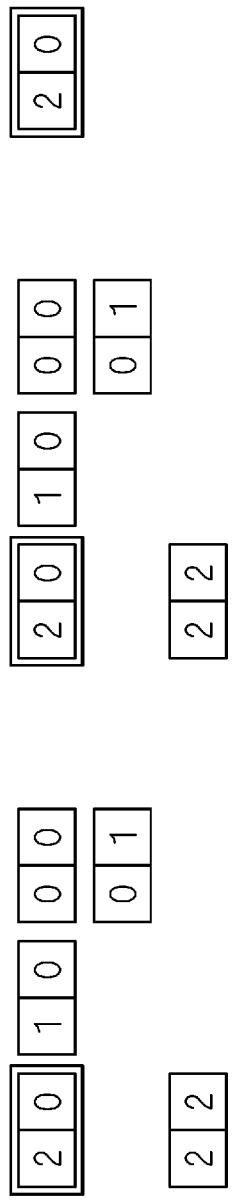
FIG. 19A-19F are a schematic diagram showing another example of merge sort processing performed by the sorter according to the second embodiment of the present invention.
Figure 19F:
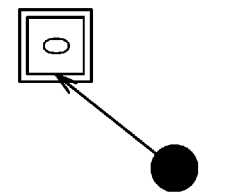
Figure 19D:
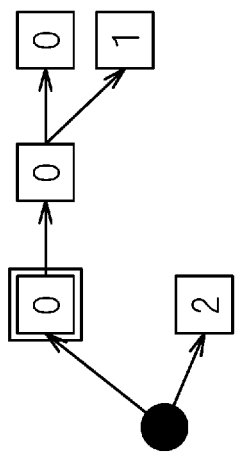
Figure 19B:
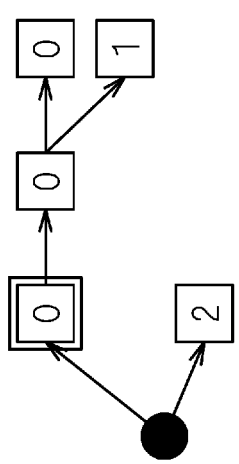

An interpretation of this as a data stream is shown in FIG. 19B and FIG. 19D, respectively, which corresponds to a comparison between '0' (a node value surrounded by the double rectangle) in FIG. 19B and '0' (a node value surrounded by the double rectangle) in FIG. 19D.

The FPGA 11 compares block '20' (a node value surrounded by the double rectangle) in FIG. 19A and block '20' (a node value surrounded by the double rectangle) in FIG. 19C. Specifically, metadata as pieces of depth information, i.e., the left digits are first compared. In the case of this example, since both pieces of depth information have a value '2', the node values (the right digits) as pieces of key information are compared next.

In the example of FIG. 19, since both of node values are also '0' identical to each other in FIG. 19A and FIG. 19C, the block '20' common to both is output (FIG. 19E). As the data stream, this corresponds to the output of the first node value '0' as shown in FIG. 19F.

In other words, when both are identical in each unit of the block with metadata attached thereto, either one of the blocks is output from both record groups, and the target block '20' is deleted from both record groups. In the first embodiment, there is a need to compare depth information and key information separately. On the other hand, in the second embodiment, since comparison information as an integer number with depth information as higher bits and key information as lower bits can be generated so that the comparison between depth information and key information can be made in one comparison process (see FIG. 21), the computational processing load can be reduced.

Figure 20:
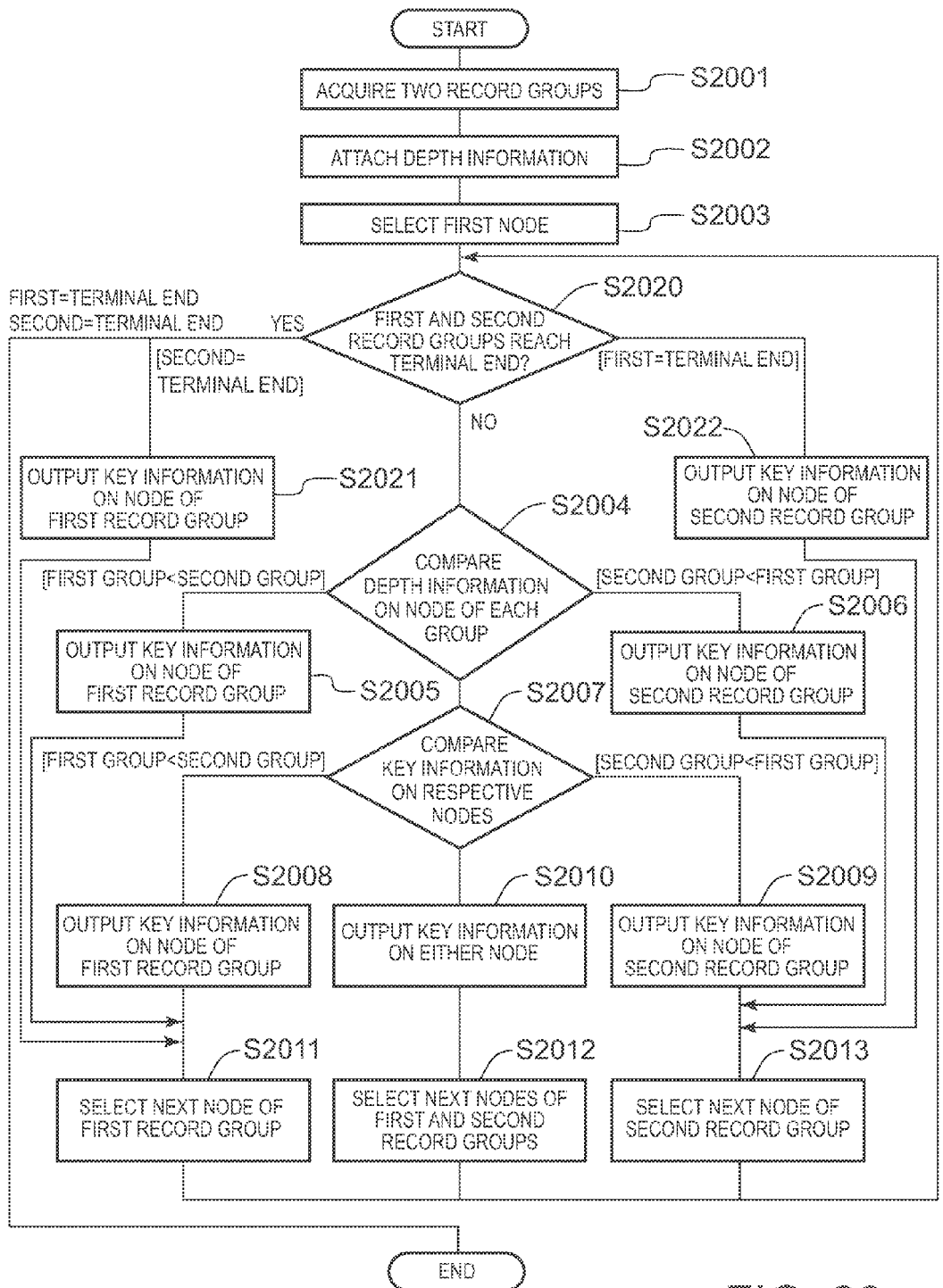
FIG. 20 is a flowchart showing a processing procedure performed by an FPGA of the sorter according to the second embodiment of the present invention.

FIG. 20 is a flowchart showing a processing procedure performed by the FPGA 11 of the sorter 1 according to the second embodiment of the present invention. In FIG. 20, the FPGA 11 of the sorter 1 acquires two record groups as targets of merge sort (step S2001). As the method of acquiring the record groups, input from the input device may be accepted or received through a network. The acquired record groups may be stored in the storage device 12 or loaded sequentially into the memory incorporated in the FPGA 11. It goes without saying that the record groups can be acquired as a data stream and the storage device 12 can be used as a buffer.

The FPGA 11 attaches depth information as metadata, indicative of a hierarchical depth in a tree structure, to key information on each node of each record included in the acquired record groups (step S2002). The FPGA 11 selects the first nodes of the first record group and the second record group as comparison targets (step S2003), and determines whether the first record group and the second record group reach their terminal ends (step S2020).

When determining that both the first record group and the second record group reach the terminal ends (First=Terminal End and Second=Terminal End in step S2020), the FPGA 11 ends the processing. When determining that only the second record group reaches the terminal end (First≠Terminal End and Second=Terminal End in step S2020), the FPGA 11 outputs key information (node value) on the node of the first record group (step S2021), and advances the processing to step S2011.

When determining that only the first record group reaches the terminal end (First=Terminal End and Second≠Terminal End in step S2020), the FPGA 11 outputs key information (node value) on the node of the second record group (step S2022), and advances the processing to step S2013. When determining that neither the first record group nor the second record group reaches the terminal end (First≠Terminal End and Second≠Terminal End in step S2020), the FPGA 11 compares the depth information on the node of the first record group and the depth information on the node of the second record group (step S2004).

When determining that the depth information on the node of the first record group is smaller than the depth information on the node of the second record group (First<Second in step S2004), the FPGA 11 outputs the key information (node value) on the node of the first record group (step S2005), and advances the processing to step S2011. When determining that the depth information on the node of the second record group is smaller than the depth information on the node of the first record group (First>Second in step S2004), the FPGA 11 outputs the key information (node value) on the node of the second record group (step S2006), and advances the processing to step S2013.

When determining that the depth information on the node of the first record group and the depth information on the node of the second record group are the same (First=Second in step S2004), the FPGA 11 compares key information on respective nodes (step S2007).

When determining that the key information on the node of the first record group is smaller than the key information on the node of the second record group (First<Second in step S2007), the FPGA 11 outputs the key information (node value) on the node of the first record group (step S2008). The FPGA 11 selects the next node of the first record group (step S2011), and returns the processing to step S2020 to repeat the above-mentioned processes.

When determining that the key information on the node of the second record group is smaller than the key information on the node of the first record group (First>Second in step S2007), the FPGA 11 outputs the key information (node value) on the node of the second record group (step S2009). The FPGA 11 selects the next node of the second record group (step S2013), and returns the processing to step S2020 to repeat the above-mentioned processes.

When determining that the key information on the node of the first record group and the key information on the node of the second record group are the same (First=Second in step S2007), the FPGA 11 outputs the key information on either one of the nodes (step S2010). The FPGA 11 selects the next nodes of the first record group and the second record group (step S2012), and returns the processing to step S2020 to repeat the above-mentioned processes.

As described above, according to the second embodiment, the time required for merge sort can be reduced effectively even when the tree structure has a deep hierarchy or the hierarchical structure is complicated, and an implementation to enable merge sort using variable-length key information can be made easy even if hardware capable of performing merge sort using only fixed-length key information is employed. Further, since the comparison information can be generated to enable one comparison process, the computational processing load can be reduced.

Figure 21:
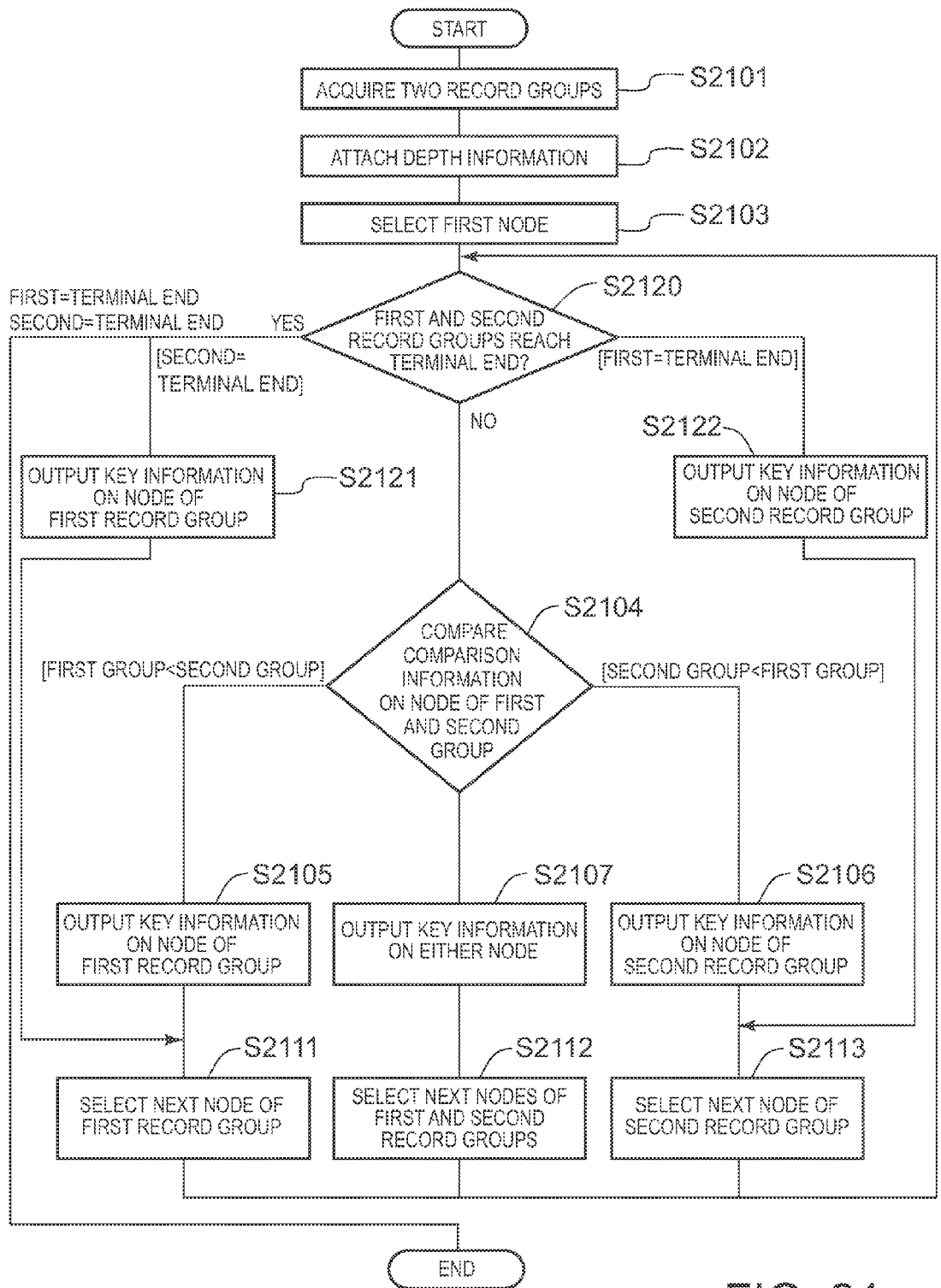
FIG. 21 is a flowchart showing another processing procedure performed by the FPGA of the sorter according to the second embodiment of the present invention.

Note that the processing procedure shown in FIG. 20 can be simplified by using, as the comparison target, the comparison information generated as an integer number with depth information as the higher bits and key information as the lower bits. FIG. 21 is a flowchart showing another processing procedure performed by the FPGA 11 of the sorter 1 according to the second embodiment of the present invention. In FIG. 21, the FPGA 11 of the sorter 1 acquires two record groups as targets of merge sort (step S2101). As the method of acquiring the record groups, input from the input device may be accepted or received through an external network. The acquired record groups may be stored in the storage device 12 or loaded sequentially into the memory incorporated in the FPGA 11. It goes without saying that the record groups can be acquired as a data stream and the storage device 12 can be used as a buffer.

The FPGA 11 attaches depth information as metadata, indicative of a hierarchical depth in a tree structure, to key information on each node of each record included in the acquired record groups (step S2102). The FPGA 11 selects the first nodes of the first record group and the second record group as comparison targets (step S2103), and determines whether the first record group and the second record group reach their terminal ends (step S2120).

When determining that both the first record group and the second record group reach the terminal ends (First=Terminal End and Second=Terminal End in step S2120), the FPGA 11 ends the processing. When determining that only the second record group reaches the terminal end (First≠Terminal End and Second=Terminal End in step S2120), the FPGA 11 outputs key information (node value) on the node of the first record group (step S2121), and advances the processing to step S2111.

When determining that only the first record group reaches the terminal end (First=Terminal End and Second≠Terminal End in step 2120), the FPGA 11 outputs key information (node value) on the node of the second record group (step S2122), and advances the processing to step S2113. When determining that neither the first record group nor the second record group reaches the terminal end (First≠Terminal End and Second≠Terminal End in step S2120), the FPGA 11 compares the comparison information on the node of the first record group and the comparison information on the node of the second record group (step S2104).

When determining that the comparison information on the node of the first record group is smaller than the comparison information on the node of the second record group (First<Second in step S2104), the FPGA 11 outputs key information (node value) on the node of the first record group (step S2105), selects the next node of the first record group (step S2111), and returns the processing to step S2120 to repeat the above-mentioned processes.

When determining that the comparison information on the node of the second record group is smaller than the comparison information on the node of the first record group (First>Second in step S2104), the FPGA 11 outputs key information (node value) on the node of the second record group (step S2106), selects the next node of the second record group (step S2113), and returns the processing to step S2120 to repeat the above-mentioned processes.

When determining that the comparison information on the node of the first record group and the comparison information on the node of the second record group are the same (First=Second in step S2104), the FPGA 11 outputs the key information on either one of the nodes (step S2107), selects the next nodes of the first record group and the second record group (step S2112), and returns the processing to step S2120 to repeat the above-mentioned processes.

It should be noted that the present invention is not limited to the aforementioned embodiments, and various changes and modifications can be made within the spirit of the present invention. For example, the present invention is not limited to using the FPGA 11, and any other processor such as a CPU (central processing unit) or GPU may be used to perform merge sort processing.

The invention claimed is:

1. A method executable by a device for merge-sorting a first record group and a second record group having a tree structure, wherein the device performs:
    a first step of acquiring the first record group and the second record group;
    a second step of attaching depth information as metadata, indicative of a hierarchical depth in the tree structure, to key information on each node of each record included in the acquired first record group and second record group; and
    a third step of comparing the depth information in preference to the key information to perform merge sort sequentially;
    wherein the depth information is set to a larger value as the hierarchical depth is deeper, and
    the third step includes the steps of:
    comparing the depth information and the key information on each node of each record included in the acquired first record group and second record group; and
    when one piece of the depth information is larger than another piece of the depth information, outputting the key information whose depth information is larger;
    when both pieces of the depth information are identical, outputting the key information having a smaller value; or
    when both pieces of the depth information are identical and both pieces of the key information are identical, outputting either one piece of the key information.

2. The method according to claim 1, further comprising:
    responsive to outputting the key information whose depth information is larger, selecting a next node in a record group corresponding to the outputted key information;
    responsive to outputting the key information having a smaller value, selecting a next node in a record group corresponding to the outputted key information; and
    comparing, for the next node, the depth information in preference to the key information to perform merge sort sequentially.

3. The method according to claim 1, wherein
the depth information is set to a smaller value as the hierarchical depth is deeper, and
the third step includes the steps of:
comparing the depth information and the key information on each node of each record included in the acquired first record group and second record group; and
when one piece of the depth information is smaller than another piece of the depth information, outputting the key information whose depth information is smaller;
when both pieces of the depth information are identical, outputting the key information having a smaller value; or
when both pieces of the depth information are identical and both pieces of the key information are identical, outputting either one piece of the key information.

4. The method according to claim 3, further comprising:
responsive to outputting either one piece of the key information, selecting a next node in the acquired first record group and second record group; and
comparing, for the next node, the depth information in preference to the key information to perform merge sort sequentially.

5. The method according to claim 1, further comprising:
generating a comparison information, wherein the comparison information is generated as an integer number with the depth information as higher bits and the key information as lower bits.

6. The method according to claim 5, further comprising:
the third step includes the steps of:
comparing the comparison information on each node of each record included in the acquired first record group and second record group.

7. A device for merge-sorting a first record group and a second record group having a tree structure, the device comprising:
a storage device; and
a processor communicatively coupled to the storage device configured to perform a method comprising:
acquiring the first record group and the second record group;
attaching depth information as metadata, indicative of a hierarchical depth in the tree structure, to key information on each node of each record included in the acquired first record group and second record group; and
comparing the depth information in preference to the key information to perform merge sort sequentially;
wherein the depth information is set to a larger value as the hierarchy is deeper, and
the comparing step includes:
comparing the depth information and the key information on each node of each record included in the acquired first record group and second record group; and
outputting the key information based on a result of the comparison means, wherein the outputting includes:
a first output which, when one piece of the depth information is larger than another piece of the depth information, outputs the key information whose depth information is larger,
a second output which, when both pieces of the depth information are identical, outputs the key information having a smaller value, or
a third output which, when both pieces of the depth information are identical and both pieces of the key information are identical, outputs either one piece of the key information.

8. The device according to claim 7, further comprising:
responsive to outputting the first output, selecting a next node in a record group corresponding to the outputted key information;
responsive to outputting the second output, selecting a next node in a record group corresponding to the outputted key information; and
comparing, for the next node, the depth information in preference to the key information to perform merge sort sequentially.

9. The device according to claim 7, wherein
the depth information is set to a smaller value as the hierarchy is deeper, and
the comparing step includes:
comparing the depth information and the key information on each node of each record included in the acquired first record group and second record group; and
outputting the key information based on a result of the comparison means, wherein the outputting includes:
a first output which, when one piece of the depth information is smaller than another piece of the depth information, outputs the key information whose depth information is smaller,
a second output which, when both pieces of the depth information are identical, outputs the key information having a smaller value, or
a third output which, when both pieces of the depth information are identical and both pieces of the key information are identical, outputs either one piece of the key information.

10. The device according to claim 9, further comprising:
responsive to outputting the third output, selecting a next node in the acquired first record group and second record group; and
comparing, for the next node, the depth information in preference to the key information to perform merge sort sequentially.

11. The device according to claim 7, further comprising:
generating a comparison information, wherein the comparison information is generated as an integer number with the depth information as higher bits and the key information as lower bits.

12. A computer program product comprising a computer readable storage medium having program instructions embodied thereon, the program instructions executable by a computer for merge-sorting a first record group and a second record group having a tree structure to cause the computer to perform a method comprising:
acquiring the first record group and the second record group;
attaching depth information as metadata, indicative of a hierarchical depth in the tree structure, to key information on each node of each record included in the acquired first record group and second record group; and
comparing the depth information in preference to the key information to perform merge sort sequentially;
wherein the depth information is set to a larger value as the hierarchy is deeper, and
the comparing step includes:
comparing the depth information and the key information on each node of each record included in the acquired first record group and second record group; and outputting the key information based on a result of the comparison means, wherein the outputting includes:
a first output which, when one piece of the depth information is larger than another piece of the depth information, outputs the key information whose depth information is larger,
a second output which, when both pieces of the depth information are identical, outputs the key information having a smaller value, or
a third output which, when both pieces of the depth information are identical and both pieces of the key information are identical, outputs either one piece of the key information.

13. The computer program product according to claim 12, the program instructions causing the computer to perform a method further comprising:
responsive to outputting the first output, selecting a next node in a record group corresponding to the outputted key information;
responsive to outputting the second output, selecting a next node in a record group corresponding to the outputted key information; and
comparing, for the next node, the depth information in preference to the key information to perform merge sort sequentially.

14. The computer program product according to claim 12, wherein
the depth information is set to a smaller value as the hierarchy is deeper, and
the comparing step includes:
comparing the depth information and the key information on each node of each record included in the acquired first record group and second record group; and
outputting the key information based on a result of the comparison means, wherein the outputting includes:
a first output which, when one piece of the depth information is smaller than another piece of the depth information, outputs the key information whose depth information is smaller,
a second output which, when both pieces of the depth information are identical, outputs the key information having a smaller value, or
a third output which, when both pieces of the depth information are identical and both pieces of the key information are identical, outputs either one piece of the key information.

15. The computer program product according to claim 14, the program instructions causing the computer to perform a method further comprising:
responsive to outputting the third output, selecting a next node in the acquired first record group and second record group; and
comparing, for the next node, the depth information in preference to the key information to perform merge sort sequentially.

16. The computer program product according to claim 12, the program instructions causing the computer to perform a method further comprising:
generating a comparison information, wherein the comparison information is generated as an integer number with the depth information as higher bits and the key information as lower bits.

17. The computer program product according to claim 16, the program instructions causing the computer to perform a method further comprising:
comparing the comparison information on each node of each record included in the acquired first record group and second record group.

* * * * *